US008984649B2

(12) United States Patent
Ryan (10) Patent No.: US 8,984,649 B2
(45) Date of Patent: Mar. 17, 2015

(54) METHOD AND SYSTEM FOR AUTHENTICATING USER ACCESS TO A RESTRICTED RESOURCE ACROSS A COMPUTER NETWORK

(75) Inventor: Andrew Ryan, Brighton (GB)

(73) Assignee: Passfaces Corporation, Monkton, MD (US)

( * ) Notice: Subject to any disclaimer, the term of this patent is extended or adjusted under 35 U.S.C. 154(b) by 0 days.

(21) Appl. No.: 13/637,015

(22) PCT Filed: Mar. 23, 2011

(86) PCT No.: PCT/GB2011/050581
§ 371 (c)(1),
(2), (4) Date: Feb. 4, 2013

(87) PCT Pub. No.: WO2011/117632
PCT Pub. Date: Sep. 29, 2011

(65) Prior Publication Data
US 2013/0139238 A1    May 30, 2013

(30) Foreign Application Priority Data

Mar. 23, 2010    (GB) .................................. 1004798.3

(51) Int. Cl.
*G06F 21/00* (2013.01)
*H04L 29/06* (2006.01)
*G06F 21/36* (2013.01)
*G06F 21/55* (2013.01)

(52) U.S. Cl.
CPC ............... *H04L 63/08* (2013.01); *G06F 21/36* (2013.01); *G06F 21/55* (2013.01); *G06F 2221/2113* (2013.01)

USPC .......................................................... 726/26

(58) Field of Classification Search
CPC  H04I 63/107; G06F 21/44; G06F 2221/2113; G06F 21/36
USPC .......................................................... 726/7
See application file for complete search history.

(56) References Cited

U.S. PATENT DOCUMENTS

| 6,209,104 | B1 | 3/2001 | Jalili | |
|---|---|---|---|---|
| 8,060,916 | B2 * | 11/2011 | Bajaj et al. | 726/3 |
| 8,577,811 | B2 * | 11/2013 | Agrawal | 705/75 |
| 2005/0265351 | A1 | 12/2005 | Smith et al. | |

(Continued)

FOREIGN PATENT DOCUMENTS

| EP | 0614559 B1 | 9/1994 |
|---|---|---|
| WO | 9311511 A2 | 6/1993 |
| WO | 9963492 A1 | 12/1999 |

OTHER PUBLICATIONS

International Search Report and Written Opinion, mailed Jun. 1, 2011, for PCT/GB2011/050581, filed Mar. 23, 2011.

(Continued)

*Primary Examiner* — Harunur Rashid
*Assistant Examiner* — Bryan Wright
(74) *Attorney, Agent, or Firm* — N W Poulsen; LA Pinol (57) ABSTRACT

A method of authenticating user access to a restricted resource across a computer network, the method characterised by: communicating client device configuration data to a server and assigning a risk analysis score based on the client device configuration data; and generating an alert at a client device in response to the risk analysis score.

20 Claims, 7 Drawing Sheets

(56) References Cited

U.S. PATENT DOCUMENTS

| | | | |
|---|---|---|---|
| 2006/0272011 A1 | 11/2006 | Ide et al. | |
| 2006/0282660 A1 | 12/2006 | Varghese et al. | |
| 2007/0277235 A1* | 11/2007 | Barrett et al. | 726/12 |
| 2009/0089869 A1* | 4/2009 | Varghese | 726/7 |
| 2009/0204580 A1* | 8/2009 | Seamon et al. | 707/3 |
| 2011/0162078 A1* | 6/2011 | Taveau et al. | 726/26 |

OTHER PUBLICATIONS

International Preliminary Report on Patentability, mailed Oct. 4, 2012, for PCT/GB2011/050581, filed Mar. 23, 2011.

Search Report, dated Jul. 19, 2011 for GB 1004798.3, filed Mar. 23, 2010.

Examination Report, dated Aug. 30, 2012 for GB 1004798.3, filed Mar. 23, 2010.

* cited by examiner

METHOD AND SYSTEM FOR AUTHENTICATING USER ACCESS TO A RESTRICTED RESOURCE ACROSS A COMPUTER NETWORK

CLAIM FOR PRIORITY

This application is a National Stage Entry entitled to and hereby claims priority under 35 U.S.C. §§365 and 371 to corresponding PCT Application No. PCT/GB2011/050581, filed Mar. 23, 2011, which in turn claims priority to British Application Ser. No. GB 1004798.3, filed Mar. 23, 2010. The entire contents of the aforementioned applications are herein expressly incorporated by reference.

The field of this invention relates generally to a method and system for authenticating user access to a restricted resource across a computer network. In particular the present invention relates to a method of communicating data between a client terminal and remote server which mitigates unauthorised interception of the data.

With access requests to computer-related resources increasing daily, security is always a major concern to both customers and resource providers. With the advances of computers and the internet it is becoming increasingly easy for people to access resources including bank accounts, medical records, shopping sites and exchange sites from any location in the world at any time of the day. Naturally, it is important that access to secure data is only granted to authorised personnel.

In such secure systems, the identity of a user is often verified through the use of authorisation data such as incorporating a username and password, personal identification number or other personal identification system, which is sent between a client terminal and a computer server.

Phishing and spyware are two examples of computer implemented attacks used by third parties to fraudulently obtain authorisation data from users.

Phishing is regarded as a criminal process used to acquire sensitive information such as usernames, passwords and credit card details by a seemingly trustworthy entity in a communication between a client acting as a genuine user and a server normally providing a login interface to the user in the form of a web browser at a terminal or the like.

Communications from sites seemingly known to a user are used to lure the user into revealing passwords. Phishing is typically carried out by e-mail or instant messaging and it often directs users to enter details at a fake website whose look and feel are almost identical to the legitimate one. Even when using server authentication, it may require tremendous skill to detect that the website is fake. Phishing is an example of social engineering techniques used to fool users and exploit the poor usability of current web security technologies.

A particular type of phishing is known as a "man in the middle attack". In this form, a phishing site attempts to retrieve user specific information, for example a password, by receiving and relaying information sent between the a client (the user) and the genuine site (the server).

Spyware is computer software that obtains information from a client without the user's knowledge or consent. In this way a user's identity maybe stolen using software that records user information in a variety of ways including, keyboard tracking, mouse click recording, recording Internet browser history and scanning computer drives to garner important information. Spyware is active at the user's device and therefore may not be detected using general analysis techniques.

One personal identification system is disclosed in EP 0614559 and mitigates at least some of the problems associated with phishing and spyware. Authentication relies on a client being presented with a set of images from which they must identify a subset that are their previously assigned image credentials. Because of this, a phishing site that attempts to dupe a client into revealing their image credentials must first determine the appropriate set of images to present to that client. If the client is presented with the wrong images, there is no way that the client can select the correct images and thereby disclose their credentials.

To effectively obtain the correct images, a phishing site must therefore be able to retrieve the correct set of images for a particular client from a genuine server by receiving and relaying information between a client and server. Such an attack is defined above as a "man in the middle attack". Typically a genuine server can implement a blacklist of known phishing sites from which it will not accept requests for information and so terminate any access. However, the use of botnets to host phishing attacks has become common practice. Botnets are ordinary home computers that have been compromised by a computer virus and so any number of "man in the middle attacks" can be set up simultaneously. As such, blacklisting sites becomes ineffective due to their large number and such blacklists can include personal home computers even after a virus has been deleted and so lead to reduced accessibility for a user of that home computer.

The images described above in relation to EP 0614559 and preferably used in embodiments of the present invention are images known to the user and termed complex images.

People can recognise very complex images known to them (typically faces) but that the basis of that recognition, being mental and conceptual, cannot easily be transferred to others. In terms of the present invention a complex image is considered to be an image that is recognisable if already known but not readily capable of unique description to a person to whom it is not known.

When a complex image is included in a set of similar but not identical images, as described hereinafter, that complex image should be distinguishable from the other images in the set, by the human senses of a person familiar with the image, within a certain time interval when the whole set is displayed. However, it should not be readily possible to describe the first image in terms which are sufficiently precise that another human being unfamiliar with that image can subsequently identify it among the others of the set. For this purpose it is assumed that normal unaided human senses are used to discern the image, and a similar time interval, and that reference to or comparison with the other images of the displayed set is not permitted as part of the description.

The use of measuring instruments and no time limitation to the display, or a recording facility, would make the unique description of any image, and its subsequent recognition, much easier, and it is to be understood that the terms used in this description of the invention assume the absence of such aids. Further, the duration of an image display may be a factor in determining whether or not an image meets the complexity requirement.

A preferred example of a complex image in a set of similar images is an image of one human face in a set of images of different human faces of similar general character.

It should be understood that an image need not necessarily be a visual image, but that subject only to the limitations of storage and reproduction, the image may be recognisable by any one of the five human senses. That is to say, there is no theoretical reason why tactile images, olfactory images, auditory images and gustatory images should not be used in accordance with the invention. For example, complex auditory images could be formed by playing recordings of the human voice. It would be difficult to describe one human voice among many similar voices such that the specific voice could be selected by another person who was not familiar with it (assuming that the different voices were, for example, speaking the same text).

In the following description, persons seeking authorisation or access to a controlled objective are referred to as users. Persons who are known to or authorised by the system are referred to as authorised users, and each authorised user is associated with a personal identity statement, which might be a code, a set of initials or the authorised user's plain name, which is known to and recognised by the system as denoting that user. Each authorised user will be linked with at least one complex image, which will be referred to as a key image for that user. Complex images which are not linked with that authorised user will be referred to as false images. It will be appreciated that a false image for one user might be a key image for another user. A user may be required to select one or more images from a display, and whatever means is used to make the selection, the identification of the selected images to the system is referred to herein as an image statement.

The present invention therefore seeks to provide a method and computer system for authenticating user access to a restricted resource which alerts a user to a possible phishing attack.

According to a first aspect of the present invention, there is provided a method of authenticating user access to a restricted resource across a computer network as claimed in claim 1.

According to a second aspect of the present invention, there is provided a computer system in which user access to a restricted resource across a computer network is provided by authenticating the user as claimed in claim 18.

Preferred embodiments are described in the dependent claims.

At least one embodiment of the present invention will now be more fully described, by way of example only, with reference to the accompanying drawings, of which.

Throughout the following description, like reference numerals shall be used to identify like parts.

Figure 1:
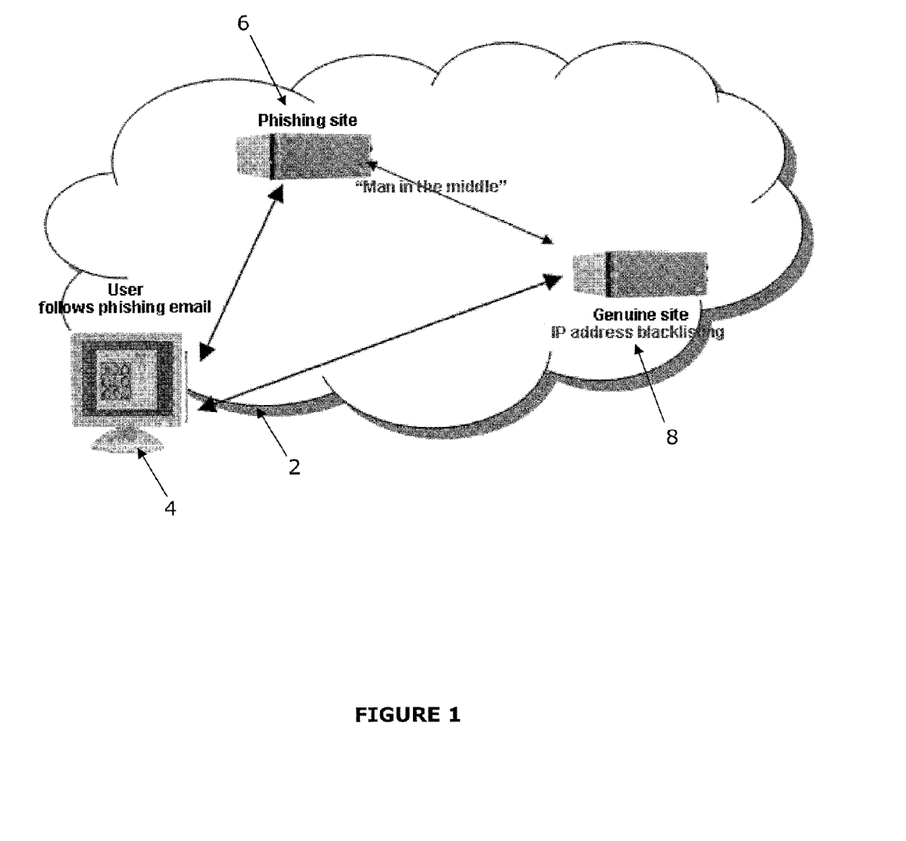
FIG. 1 illustrates a communication between a computer resource, a phishing site and a user in what is a typical "Man-in-the-Middle" phishing attack.

FIG. 1 illustrates a computer network 2 between a user 4, a phishing site 6 and a server 8 in what is a typical "Man-in-the-Middle" phishing attack. To effectively phish, a phishing site must be able to retrieve information from the user 4 to access the server 8. In this example the phishing server is using user information provided from the user 4 to access the server 8. The present invention will alert the user to the phishing between the user 4 and the server 8.

The communication is understood to be any form of communication between two computer devices in a network, such as the internet or world wide web.

Examples of the forms of communications which may be used are protocols such as HTTP, TSL, SSL and HTTPS. HTTP or Hyper Text Transfer Protocol is the set of rules for exchanging files between computer related resources (text, graphic images, sound, video, and other information) on the World Wide Web. Transport Layer Security (TLS) and Secure Sockets Layer (SSL), are image modification protocols that provide security for communications over networks. Hypertext Transfer Protocol Secure (HTTPS) is a combination of the HTTP with the SSL/TLS protocols to provide encryption and secure identification of the server. HTTPS connections are often used for payment transactions on the World Wide Web and for sensitive transactions in corporate information systems. A server is a computer running a server operating system to provide services to a user. Software forming part of the server operating system can provide many functions such as a security server, a website, a bank computer, a health provider computer and so on.

Figure 2:
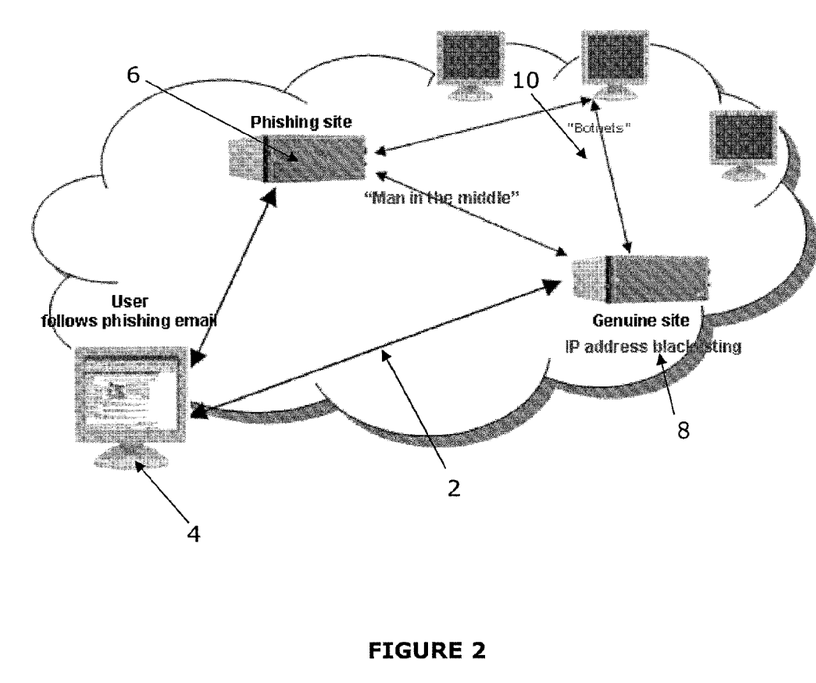
FIG. 2 illustrates a communication between a computer resource, a phishing site and a user in what is a typical "Man-in-the-Middle" phishing attack using third party computers.

FIG. 2 illustrates a more extensive computer network 2 between a user 4, a phishing site 6 and a server 8 in what is a typical "Man-in-the-Middle" phishing attack using third party computers or "botnets" 10. In this example at least three botnets 10 are being used to attempt to retrieve information from the user 4. A larger number of botnets could be used to target a single user. The present invention will alert the user to phishing between the user 4 and the server.

Figure 3:
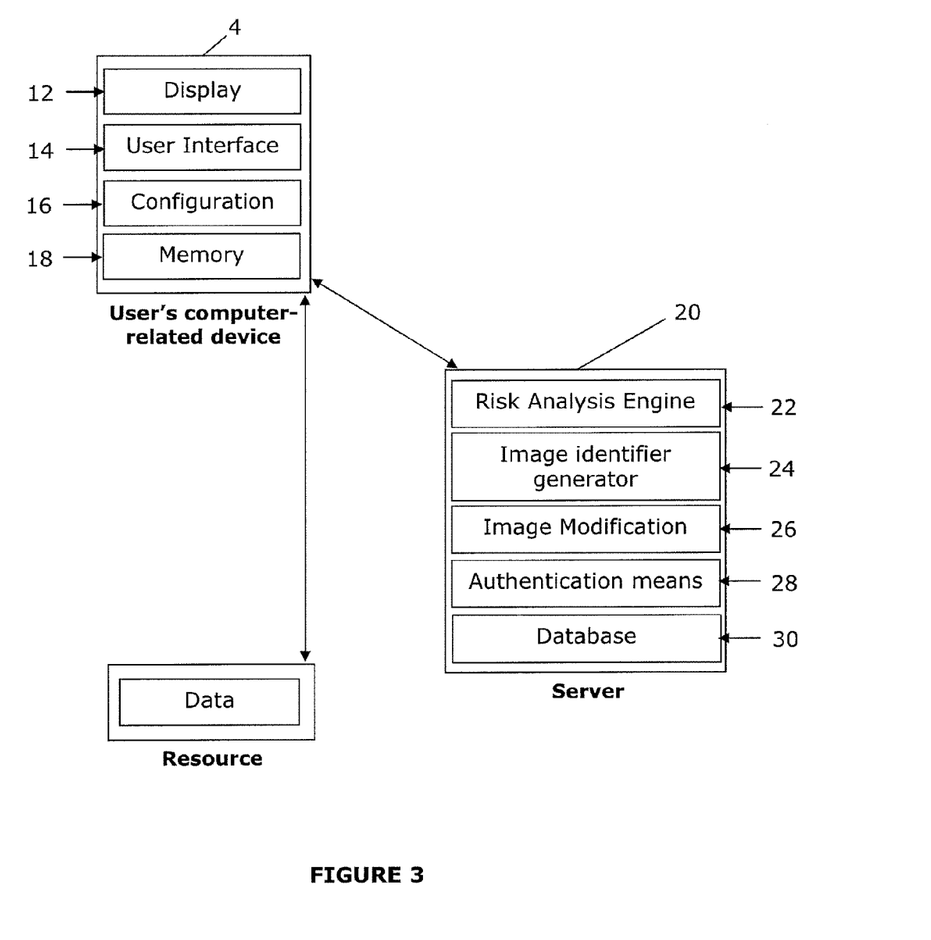
FIG. 3 illustrates an authorization system in accordance with the present invention.

The authorisation system of FIG. 3 comprises a user's personal computer 4, a server 20 and a resource 32, all three of which have bi-directional communication with one another on a computer network.

The user's personal computer 4 comprises a display 12, a user interface such as a keyboard 14, configuration 16 and memory 18.

Suitable devices for the computer include, but are not limited to, personal computers PC, PDAs, mobile phones and any other device capable of external communications comprising the features listed above. For the present embodiment of the invention, the computer related device described is a PC.

The user interface 14 may be any means capable of user interaction such as a keyboard, virtual keyboard or simple keypad. For the purposes of this description, the interface is a graphical user interface (GUI) and the interface is capable of receiving at least one input from a user. The input is provided using a keyboard.

The configuration 16 includes any data associated with the user's personal computer 4 including: cookies or flash objects stored in the user's browser, a comparison of browser and operating system details, the user's Internet Protocol address (or IP address subnet), the IP address geo-location and behaviour analysis such as a time of day logon.

The memory 18 is capable of storing information such as images or alphanumerical characters and passwords, which may be recalled by the user's personal computer 4, the server 20 or the resource 32 at a later time. The memory may be a simple storage medium within a computer such as read-only memory (ROM) including such devices as electrically erasable programmable read-only memory (EEPROM); or Random-access memory (RAM) devices including dynamic random-access memory (DRAM) chips. Such devices are well known to those skilled in the art of computers.

The server 20 comprises a risk analysis engine 22, an image identifier generator 24, an image modification means 26 and an authentication means 28. The risk analysis engine is capable of analysing data of the configuration 16 over the computer network received from the user's personal computer 4 to provide a risk score for the received data.

The server 20 may be any computerized process that shares a resource to one or more user processes. The image modification means 26 comprises a hardware and/or software element that modifies an image stored at the server 20. The image modification means may introduce noise into the image, render characters or text on the image or modify it in a way such that the original image is different from the modified image and such that it is difficult to recreate the original image from the modified image. Such image modification means are not unknown to those skilled in the art of computer photography and many software packages are readily available to buy. The image modification means used in this description is a software module.

The resource 32 may comprise data accessible to the user's personal computer 4, for example a website, bank account, health details and/or pharmacy details. The resource may be an online service application such as a banking application for personal finance.

Risk analysis engines are hardware and/or software tools used in computer related devices to analyse various aspects of communication and configuration between at least two computer-related devices. Risk analysis engines are well known to those skilled in the art of computer-related authorisation methods. In the present invention, the risk analysis engine 22 is used to detect the data of the configuration 16 of the user's personal computer 4 and to analyse the communication between the server and the personal computer 4 and the cookies stored, flash objects stored, the operating system details, the IP address (or IP address subnet) and/or the IP address geo-location of the user's personal computer 4. The risk analysis engine 22 is also capable of analysing the time of day of login and the frequency of login of the user.

By weighting and combining the data of the configuration 16 the risk analysis engine generates a risk score for comparison against a pre-defined threshold—henceforth the risk threshold. The server 20 can use the risk score to provide an indication of a security threat to the user, for example if "a-man-in-the-middle attack" attempts to access a server 20 using a user's authentication the risk score would be above the risk threshold because, for example, the geo-location would be different form the user's known geo-location.

The image identifier generator 24 generates a unique identifier for each image. The image identifiers may be preferably, but not exclusively, alpha-numeric strings or links to specific locations at the server or the user's computer related device's memory. The server 20 may then send the image identifier and/or the image to the user's personal computer 4 to be displayed on the user display 12 as, typically, 64×80 or 62×78 pixel images. The images may consist of an image identifier and a corresponding image file (e.g. JPG, GIF, and BMP) or an HTML file. The images may be displayed on the display using any known means examples including a browser, a webpage, pop-up and/or an applet.

The database 30 stores data in memory on the server. The data stored may be users' passwords, image identifiers, blacklisted phishing sites and various other data. The database consists of software-based "containers" that are structured to collect and store information so the server can retrieve, add, update or remove such information in an automatic fashion. Databases such as those used in this description are well known to those skilled in the art of computer programming.

The authentication means 28 in its simplest form comprises a look up table containing a list of authentication data which compares authentication data returned from a user's personal computer 4 to data which may be stored in the server's 20 database 30 to authenticate the identity of the user. The authentication is then used to grant or deny a user's personal computer 4 access to a resource 32.

Figure 4:
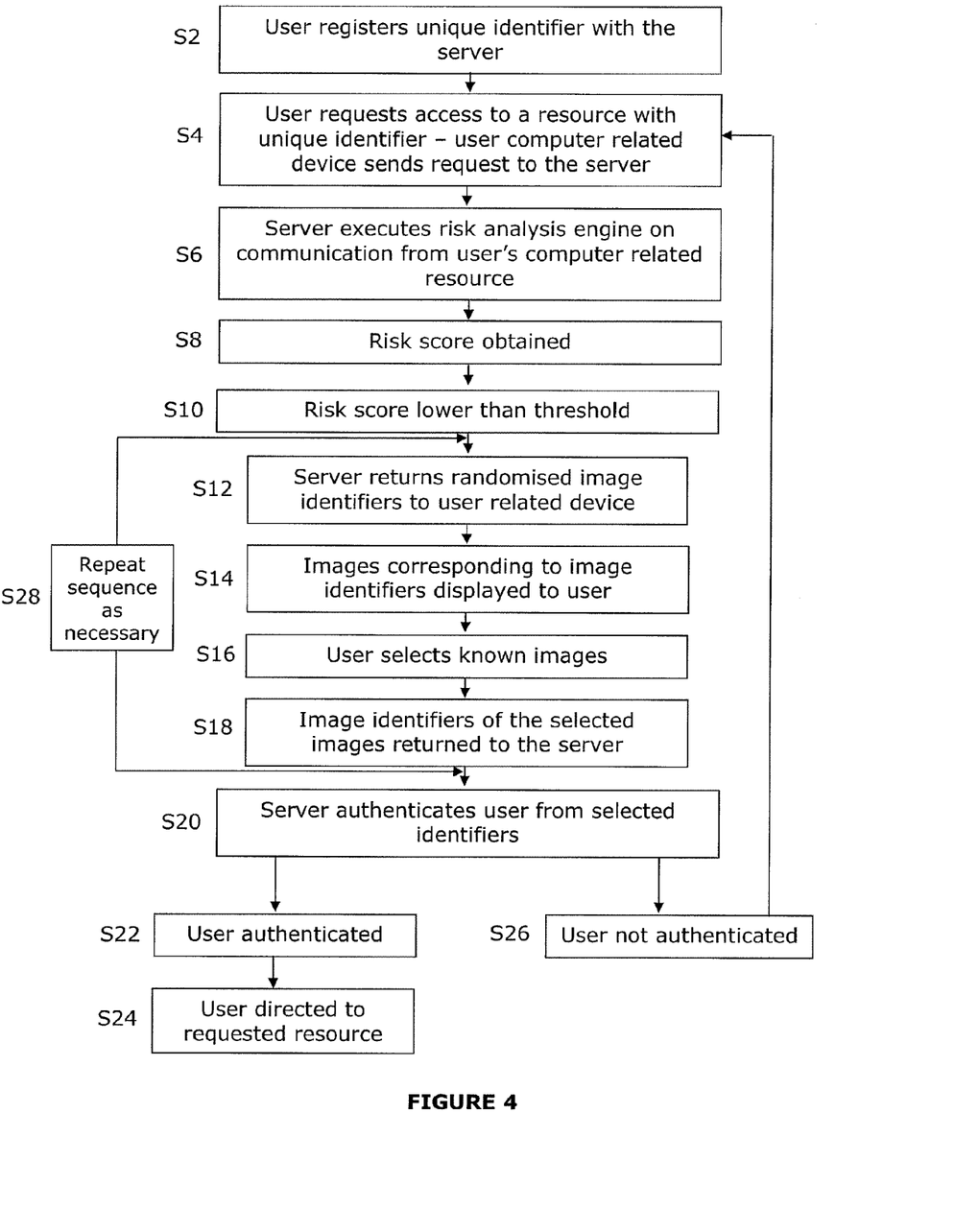
FIG. 4 is a simplified diagram of the data exchanges that are performed in accordance with a first embodiment of the data communication method of the present method when a risk score is lower than the threshold.

In use, with reference to FIG. 4 the method of authorisation when the risk score is below the risk threshold is as follows. A user initially registers (S2) with a server 20 and will upload to the server 20; select at the server; or will be presented with to choose from on the display 12, a selection of images—henceforth called known images. The server also comprises images unknown to the user. The unknown images are stored in the server database 30. The user also selects, or is provided with a password from the server. When the user registers (S2) the server will acknowledge the configuration of the user's computers related device, for example cookies stored on the user's computer-related device, the IP address (or IP address subnet and/or other behavioural attributes, for example the time of logon and/or the IP address geo-location of the user's computer-related device.

When the user requests (S4) access to a resource 32 on his computer related device, the user's computer-related device 4 sends (S4) a request to the server 20 to access the resource 8. The request includes the unique identifier specific to the user.

Upon receiving the request the server 20 executes (S6) the risk analysis engine 22 on the communication 2 from the computer related device 4 and a risk score is obtained (S8) from the analysis. The communication 22 comprises configuration specific to the user and the computer related device. This risk score is compared to a threshold set by the server. The risk score is stored in the database.

When the risk score is lower than the set threshold (S10), the image identifier generator 24 sends (S12) randomized image identifiers to the user's computer related device. The images corresponding to the randomised imaged identifiers are retrieved by the computer related device (S14), from the server and/or the memory, and displayed in an array on the display 12.

The user then selects (S16) the known modified images using the user interface 14, and the image identifiers corresponding to the selected images are sent (S18) to the server 20. The user may be required to select images from a number of different arrays (S28).

The server 20 then authenticates (S20) the user from the returned image identifiers using the authentication means 28. If the user is authenticated (S22) the server 20 will direct (S24) the user to the resource 8.

If the user is not authenticated (S26) the server will terminate the session (S60) or return the user to the beginning of the method (S4).

Figure 5:
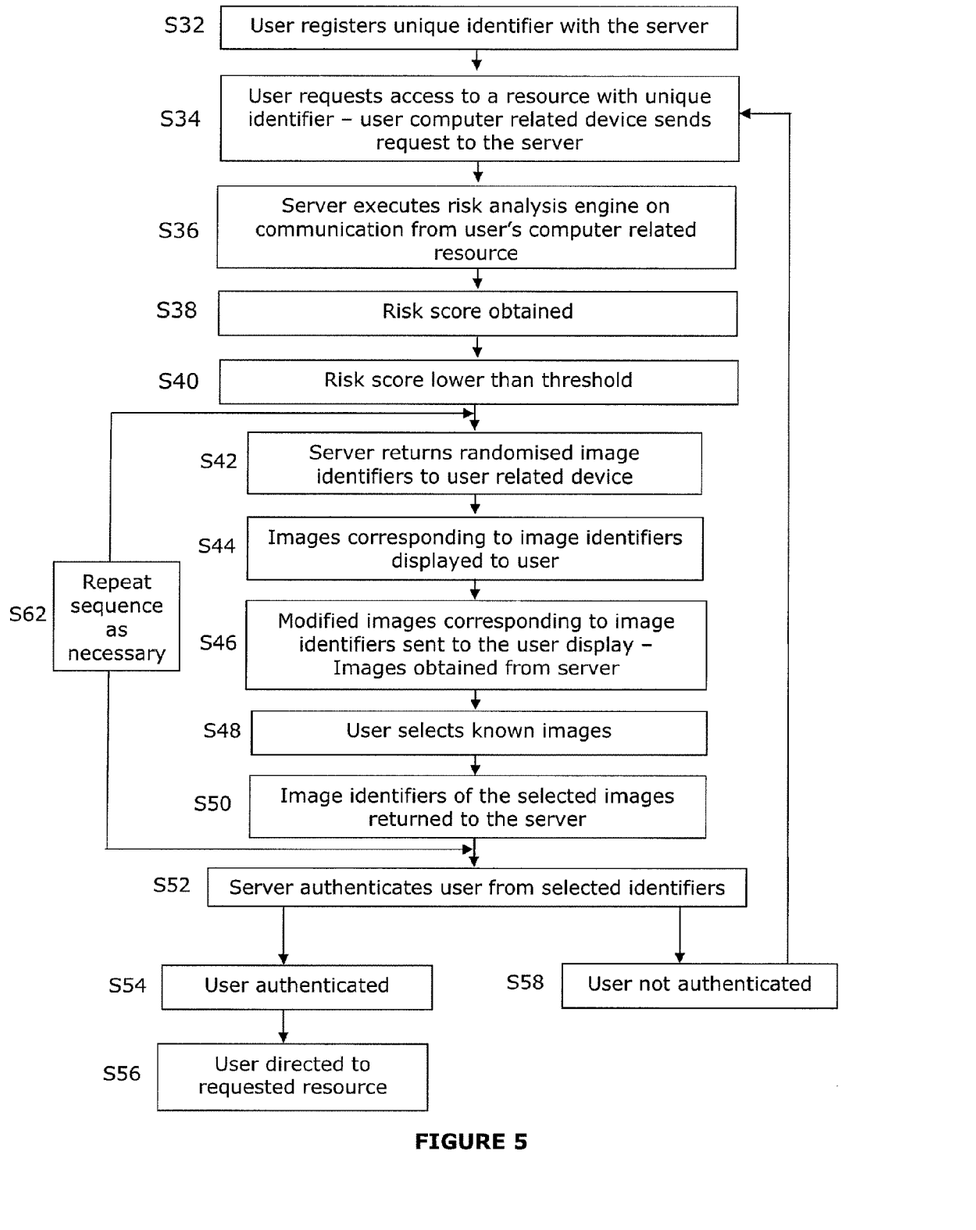
FIG. 5 is a simplified diagram of the data exchanges that are performed in accordance with a second embodiment of the data communication method of the present method when a risk score is higher than the threshold.

In use, with reference to FIG. 5, the method of authorisation when the risk score is above the risk threshold is as follows. A user initially registers (S32) with a server 20 and will upload to the server 20; select at the server; or will be presented with to choose from, a selection of images—henceforth called known images. The server also comprises images unknown to the user. The unknown images are stored in the server database 30. The user also selects, or is provided with a password from the server. When the user registers (S32) the server will acknowledge the configuration of the user's computers related device, for example cookies stored on the user's computer-related device, the IP address (or IP address subnet and/or other behavioural attributes, for example the time of logon and/or the IP address geo-location of the user's computer-related device.

When the user requests (S34) access to a resource 8 on his computer related device, the user's computer-related device 4 sends (S34) a request to the server 20 to access the resource 8. The request includes the unique identifier specific to the user.

Upon receiving the request the server 20 executes (S36) the risk analysis engine 22 on the communication 2 from the computer related device 4 and a risk score is obtained (S38) from the analysis. The communication 22 comprises configuration specific to the user and the computer related device. This risk score is compared to a threshold set by the server. This data will be stored in the database.

When the risk score is higher than the set threshold (S40), the image identifier generator 24 sends (S42) randomized image identifiers to the user's computer related device. The images in the server database corresponding to the image identifiers are distorted (S44) using image modification means 26. The distorted images comprise noise and characters rendered on the normal images stored in the server database.

The modified images corresponding to the randomised imaged identifiers are sent (S46) to the user's computer related device 4, from the server, and displayed in an array on the display 12. This alerts the user that he may be subject to a security threat, and has the option to continue accessing the resource or terminating the access request and starting a new request (S34).

If the user continues with the access request, the user selects (S48) the known modified images using the user interface 14, and the image identifiers corresponding to the selected images are sent (S50) to the server 20. The user may be required to select images from a number of arrays (S62).

The server 20 then authenticates (S52) the user from the returned image identifiers using the authentication means 28. If the user is authenticated (S54) the server 20 will direct (S56) the user to the resource 8.

If the user is not authenticated (S58) the server will terminate the session (S60) or return the user to the beginning of the method (S34).

Figure 6:
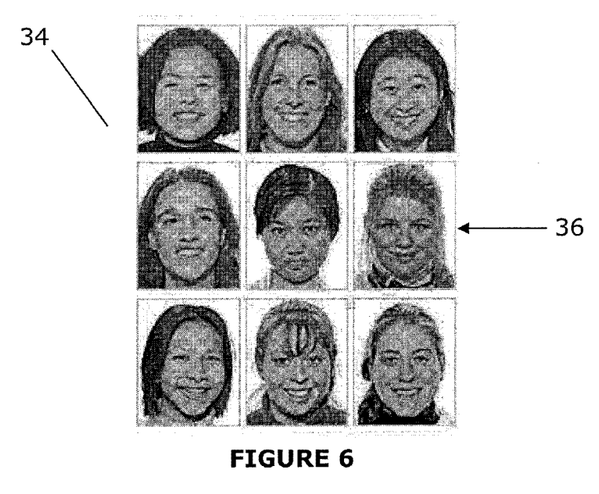
FIG. 6 illustrates an example of a randomized image collection.

FIG. 6 illustrates an example of a randomised image collection 34, displayed to the user as, typically, 64×80 or 62×78 pixel images, in a 3×3 array. At least one of the images is known to the user 36. It will, of course, be apparent that the layout of the array, the design variations of the images, the size of the images and the images themselves will not be limited to the examples given above. The image collection 34 may be displayed on the user display by any means capable of displaying images such as a browser, a webpage and/or an applet. It will also be apparent that the display will comprise other features to enable the user to interact with the user computer-related device, for example individual input keys, text boxes, buttons and other such means of interaction.

Figure 7:
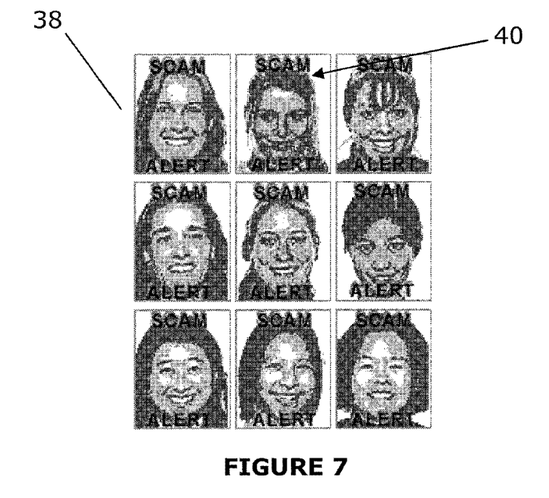
FIG. 7 illustrates an example of randomized modified image collection.

FIG. 7 illustrates an example of a modified randomised image collection 38, displayed to the user as 60×80 pixel images, in a 3×3 array. At least one of the images is known and recognisable to the user 40. It will, of course, be apparent that the layout of the array, the design variations of the images, the size of the images, the images themselves and the modification of the images will not be limited to the examples given above. The image collection may be displayed on the user display by any means capable of displaying images such as a browser, a webpage and/or an applet. The images are modified using an image modification means 26 associated with the server. The image modification means may introduce noise into the image, render characters or text on the image or modify it in a way such that the original image is different from the modified image and such that it is difficult to recreate the original image from the modified image. Such image modification means are not unknown to those skilled in the art of computer photography and many software packages are readily available to buy. The image modification means used in this description is a software module.

Figure 8:
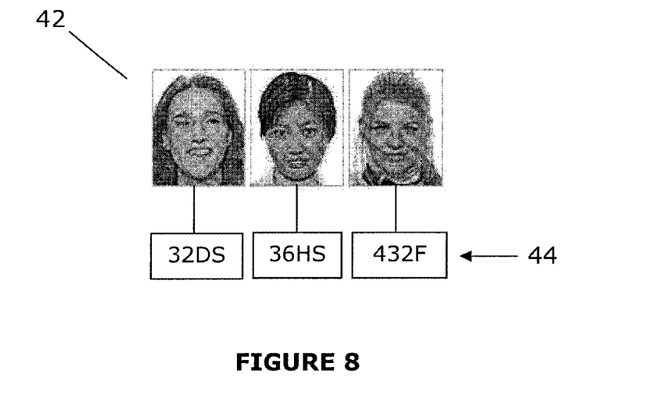
FIG. 8 illustrates images of FIG. 5 and the respective image identifiers.

FIG. 8 illustrates images of FIG. 6 and the image identifiers 44 associated with each image. The image identifiers are generated at the server 20 using the image identifier generator 24. The image identifiers comprise preferably, but not exclusively, alphanumeric characters. The image identifiers may be assigned to the images when the user uploads the images to the server; or selects images from the server; or is presented with images by the server; or the image identifiers may be assigned to the images in the database 30 at any time.

When an image is selected by the user, the corresponding image identifier 44 is sent to the server 20 and the authentication means 28 verifies that the correct image has been selected.

It will be appreciated that although only one particular embodiment of the invention has been described in detail, various modifications and improvements can be made by a person skilled in the art without departing from the scope of the present invention. For example, the present invention can be used in conjunction with any other authentication method as part of a multi-factor authentication scheme.

The invention claimed is:

1. A method of authenticating user access to a restricted resource across a computer network, the method comprising:
   receiving user input identifier data, corresponding to a user, from a client device;
   determining whether the user is authorized, and if authorized, generating a random series of image identifiers in response to said user input identifier data;
   generating a set of user selectable images comprising a collection of images including a user-known image and a plurality of false images;
   receiving client device configuration data;
   determining a risk analysis score based on the client device configuration data;
   distorting each of the set of user selectable images if the risk analysis score is above a risk threshold;
   assigning the image identifiers to the user selectable images;
   sending the distorted user selectable images to the client device for display;
   receiving the image identifier assigned to the distorted image selected by the user;
   authenticating identity of said user from said selected image identifier; and
   allowing access to a restricted resource.

2. The method according to claim 1, wherein depending upon the risk analysis score, the restricted resource limits access to a service application.

3. The method according to claim 1, wherein the distorting comprises image modification.

4. The method according to claim 1, wherein the user input identifier data is a username.

5. The method according to claim 1, wherein each image identifier relates to an individual image.

6. The method according to claim 5, wherein each individual image is stored at a location accessible to the client device.

7. The method according to claim 1, wherein the restricted resource is a service application.

8. The method according to claim 1, wherein the client device configuration data is derived from a configuration local to the client device.

9. The method according to claim 1, wherein the client device configuration data comprises at least one of web browser data, operating system data, an internet protocol address, geolocation data, and/or behavior data.

10. The method according to claim 9, wherein the web browser data includes cookies and flash objects, the internet protocol address includes geolocation, and/or the behavior data includes time of day of login.

11. A non-transitory carrier medium carrying software control code to, when running, implement the method of claim 1.

12. The method of claim 7, wherein access to the service application is limited based on the risk analysis score.

13. A tangible non-transitory carrier medium carrying software control code to:
receive user input identifier data, corresponding to a user, from a client device;
determine whether the user is authorized, and if authorized, generate a random series of image identifiers in response to said user input identifier data;
generate a set of user selectable images comprising a collection of images that includes at least one user-known image and a plurality of false images;
receive client device configuration data;
determine a risk analysis score based on the client device configuration data;
distort images in the set of user selectable images if the risk analysis score is above a risk threshold;
assign the image identifiers to images in the set of user selectable images;
send the set of user selectable images to the client device for display;
receive the image identifier assigned to at least one image selected by the user from the set of user selectable images;
authenticate the identity of said user based on said received image identifier; and
allow access to a restricted resource.

14. The tangible non-transitory carrier medium according to claim 13, wherein the restricted resource is a service application.

15. The tangible non-transitory carrier medium according to claim 13, wherein the user input identifier is a username previously generated by the user in response to a request.

16. The tangible non-transitory carrier medium according to claim 13, wherein each image identifier relates to an individual image stored at a location accessible to the client device.

17. The tangible non-transitory carrier medium according to claim 13, wherein the client device configuration data includes at least one of browser cookies, flash objects, browser data, operating system data, internet protocol address, geolocation data, and/or behavior data.

18. An apparatus, comprising:
a memory; and
a processor disposed in communication with said memory, and configured to issue a plurality of processing instructions stored in the memory, wherein the processor issues instructions to:
receive user input identifier data, corresponding to a user, from a client device;
determine whether the user is authorized, and if authorized, generate a random series of image identifiers in response to said user input identifier data;
generate a set of user selectable images comprising a collection of images that includes at least one user-known image and a plurality of false images;
receive client device configuration data;
determine a risk analysis score based on the received client device configuration data;
distort the set of user selectable images if the risk analysis score is above a pre-defined risk threshold;
assign the image identifiers to each of the set of user selectable images;
send the set of user selectable images to the client device for display to a user;
receive an image identifier assigned to an image from the set of user selectable images based on a user selection of that image; and
allow access to a restricted resource by said user based on said image identifier.

19. The apparatus according to claim 18, wherein the client device configuration data includes at least one of browser cookie data, flash object data, browser data, operating system data, internet protocol address, geolocation data, and/or behavior data.

20. A server-implemented method of authenticating user access to a restricted resource across a computer network, the method comprising:
receiving, at a server, user input identifier data, corresponding to a user, from a client device;
determining whether the user is authorized, and if authorized, generating a random series of image identifiers in response to said user input identifier data;
generating a set of user selectable images comprising a collection of images including at least one user-known image and a plurality of false images;
receiving client device configuration data;
determining a risk analysis score based on the client device configuration data;
distorting each of the set of user selectable images if the risk analysis score is above a specified risk threshold;
assigning the image identifiers to each of the user selectable images;
sending user selectable images from the server to the client device for display;
receiving, at the server, the image identifier assigned to an image selected by the user from the user selectable images sent to the client device; and
authenticating the identity of said user at the server based on said received image identifier to allow access to a restricted resource.

* * * * *